United States Patent
Chen et al.

(10) Patent No.: US 9,892,255 B2
(45) Date of Patent: Feb. 13, 2018

(54) PRESENTING SERVICE PROCESSES

(71) Applicant: TENCENT TECHNOLOGY (SHENZHEN) COMPANY LIMITED, Shenzhen (CN)

(72) Inventors: Qiru Chen, Shenzhen (CN); Yu Zhang, Shenzhen (CN); Xiao Yang, Shenzhen (CN); Cheng Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 142 days.

(21) Appl. No.: 14/703,925

(22) Filed: May 5, 2015

(65) Prior Publication Data
US 2015/0235023 A1 Aug. 20, 2015

Related U.S. Application Data

(63) Continuation of application No. PCT/CN2013/085278, filed on Oct. 16, 2013.

(30) Foreign Application Priority Data

Nov. 13, 2012 (CN) .......................... 2012 1 0453720

(51) Int. Cl.
*G06F 11/00* (2006.01)
*G06F 21/55* (2013.01)
*H04L 29/06* (2006.01)

(52) U.S. Cl.
CPC .............. *G06F 21/55* (2013.01); *H04L 63/14* (2013.01)

(58) Field of Classification Search
None
See application file for complete search history.

(56) References Cited

U.S. PATENT DOCUMENTS 5,301,348 A * 4/1994 Jaaskelainen ......... G06F 3/0481
345/469.1
5,742,779 A * 4/1998 Steele ................. G06F 3/04817
345/660

(Continued)

FOREIGN PATENT DOCUMENTS

CN  1673938 A  9/2005
CN  102065177 A  5/2011
(Continued)

OTHER PUBLICATIONS

Search Report in International Application No. PCT/CN2013/085278 dated Jan. 23, 2014.
(Continued)

*Primary Examiner* — Lisa Lewis
*Assistant Examiner* — Olanrewaju Bucknor
(74) *Attorney, Agent, or Firm* — Marshall, Gerstein & Borun LLP

(57) ABSTRACT

Technical solutions for presenting service processes are provided. In the solutions, operation instructions are received, and in response to the received operation instructions, a page of a first service process is displayed and the first service process is started; when a page of a second service process is displayed instead of the page of the first service process, execution progress of the first service process is presented through an icon of the first service process.

14 Claims, 7 Drawing Sheets

(56) References Cited

U.S. PATENT DOCUMENTS

| | | | |
|---|---|---|---|
| 7,665,031 B2 | 2/2010 | Matthews et al. | |
| 7,827,505 B2 * | 11/2010 | Anzelde | G06F 3/0481 715/748 |
| 8,589,815 B2 * | 11/2013 | Fong | G06F 3/04817 715/772 |
| 8,769,428 B2 | 7/2014 | Mir et al. | |
| 8,812,988 B2 * | 8/2014 | Kam | G06F 3/04817 715/810 |
| 2006/0020904 A1 | 1/2006 | Aaltonen et al. | |
| 2006/0242712 A1 * | 10/2006 | Linn | G06F 21/56 726/26 |
| 2008/0047007 A1 * | 2/2008 | Satkunanathan | H04L 12/585 726/22 |
| 2009/0228807 A1 * | 9/2009 | Lemay | G06Q 10/107 715/752 |
| 2010/0077338 A1 * | 3/2010 | Matthews | G06F 3/0481 715/779 |
| 2010/0159898 A1 * | 6/2010 | Krzyzanowski | G06F 9/4445 455/414.1 |
| 2010/0313159 A1 * | 12/2010 | Decker | G06F 17/30899 715/772 |
| 2012/0023432 A1 * | 1/2012 | Aguren | G06F 11/3034 715/772 |
| 2012/0210217 A1 * | 8/2012 | Abbas | G11B 27/031 715/716 |

FOREIGN PATENT DOCUMENTS

| | | |
|---|---|---|
| CN | 102426507 A | 4/2012 |
| CN | 102591655 A | 7/2012 |
| CN | 102754091 A | 10/2012 |

OTHER PUBLICATIONS

International Preliminary Report on Patentability from PCT/CN2013/085278 dated May 28, 2015.

Office Action from Chinese Application No. 2012104537204 dated Jun. 12, 2016.

* cited by examiner

101

102  103    104

PRESENTING SERVICE PROCESSES

This application is a U.S. continuation of International Application No. PCT/CN2013/085278, filed on Oct. 16, 2013. This application claims the benefit and priority to Chinese Patent Application No. 201210453720.4, filed on Nov. 13, 2012. The entire disclosures of each of the above applications are incorporated by reference.

TECHNICAL FIELD

The present application relates to a field of Internet and Computer Technologies, and particularly to presenting service processes.

BACKGROUND

In Windows environments, an icon normally exists in a static state. The icon may be a small picture or an object which represents a file, program, webpage or command and can help a user in rapidly implement the command or run the program. A command may be executed through a single click or double click on the icon. The icon may also be used in a browser to quickly present contents. The icon has several functions of identification, status indication, action switch and etc.

The function of identification refers to providing the identification for a software product or a file for the user through visualization of the icon. For example, an icon 101 in FIG. 1a is an identifier of an Instant Messaging (IM) client such as a QQ client. The function of status indication refers to indicating various statuses via various icons. For example, an icon of a red exclamation mark represents a dangerous or warning status. The function of action switch refers to identifying an action to be executed by an icon through clicking or moving which the user can enable a computer system to perform a corresponding operation. For example, three icons 102-104 in FIG. 1b represent operations of minimizing a window, maximizing a window and closing a window.

In addition, a progress bar or a counting backward method is usually used in the Windows environment to present a service process, i.e., the whole process from the beginning of an operation to the end thereof, and texts may also be used to describe the key point(s) of the whole process.

SUMMARY

The present application provides a method for presenting service processes, including: receiving a first operation instruction; displaying a page of a first service process in response to the received first operation instruction; receiving a second operation instruction through the page of the first service process; starting the first service process in response to the received second operation instruction; and presenting execution progress of the first service process through an icon of the first service process upon displaying a page of a second service process instead of the page of the first service process in response to receiving a third operation instruction.

The present application also provides an apparatus for presenting service processes, including: a storage medium and a processor, wherein the storage medium stores instructions executable for the processor comprising a starting module and a presenting module; the starting module is adapted to receive a first operation instruction, display a page of a first service process in response to the received first operation instruction, receive a second operation instruction through the page of the first service process, start the first service process in response to the received second operation instruction; and the presenting module is adapted to present execution progress of the first service process through an icon of the first service process upon displaying a page of a second service process instead of the page of the first service process in response to receiving a third operation instruction.

Accordingly, a machine-readable storage medium is provided, which is to store instructions to cause a machine to execute the above method.

DETAILED DESCRIPTION

In embodiments of the present invention, the entire execution progress of the service process can be presented through the icon of the service process.

Figure 2:
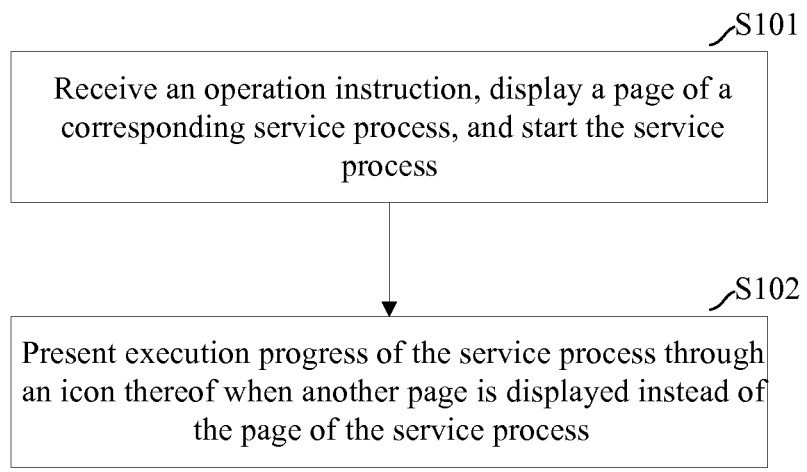
FIG. 2 shows a flow chart of a method according to an embodiment.

FIG. 2 shows a flow chart of a method according to an embodiment. As shown in FIG. 2, the method for dynamically presenting a service process through an icon including the following steps.

In Step S101, an operation instruction is received by an application client running on a computing device such as a PC, a tablet or a mobile phone or etc., through a main interface of the application client, and a page of a corresponding service process is displayed on a screen of the computing device in response to the received operation instruction. Then, the service process can be started in response to receiving another operation instruction through the page of the service process.

In an embodiment, the application client is running on a Windows system, and there are various icons presented on the main interface of the application client for identifying various service processes, e.g., in the main interface of a QQ PC manager, there are various icons provided for service processes of safety examination, anti-virus, real-time protection, fixing vulnerability, system clearance, computer acceleration, software management and so on. In another embodiment, the application client may be run on another operating system such as a UNIX system or etc.

In practice, the user can enter a page (namely an interface) of a service process through clicking an icon representing the service process in the main interface (i.e., issuing an operation instruction through the main interface), and then can start the service process through clicking a button in the page of the service process (i.e., issuing another operation instruction through the page of the service process).

In Step S102, when the page displayed on the screen of the computing device is switched from the page of the service process to the page of another service process, the execution progress of the first service process is presented through the icon of the first service process.

In an embodiment, upon a user clicking the icon of a second service process (i.e., the application client running on the computing device receiving an operation instruction through the icon of another service process), the page of the second service process is displayed instead of the page of the first service process. In this situation, the execution progress of the first service process can also be presented through the icon of the first service process.

Thus, after the service process is started, the execution progress thereof can be presented dynamically through the icon of the service process.

In one embodiment, after the service process is started, the execution progress of the service process is presented on the icon of the service process, and simultaneously, a default mode for presenting the execution progress may be used. The default mode may refer to presenting the execution progress by a progress bar or texts or etc., in the page of the service process. Thus, the user can directly learn the execution progress of the service process and dynamic changes thereof from both the page of the service process currently being displayed and the icon of the service process.

In another embodiment, if the whole procedure of the service process will spend a long period of time, the user usually needs to execute other service processes before the former service process is completed. In this situation, the user may click the icon of another service process to switch to another page, thus, the page of another service process is displayed instead of the page of the former service process, and meanwhile, the execution progress of the former service process is presented on the icon of the former service process, so that the user is able to learn the dynamic progress of the former service process through the icon thereof even when the page of the former service process is not displayed on the main interface of the application client.

In an embodiment, the execution progress of the service process may be presented by displaying a dynamic image (namely an animation) on the icon of the service process. The execution-progress presentation based on the dynamic image may be implemented by a scanner and an animation manager. Here, the various service processes provided by the application client have their respective scanners.

In an embodiment, the service process is executed through scanning of a scanner corresponding to the service process. During scanning of the scanner, the scanner registers in the animation manager the information obtained from the scanner's scanning such as key points from the beginning of scanning to the end of scanning, and feeds back a scanning result to the animation manager. The animation manager controls displaying of the dynamic image on the icon of the first service process according to the information registered by the scanner, for example, the animation manager may controls an animation's starting and stopping as well as displaying of the scanning result on the icon of the service process.

In an embodiment, upon receiving a piece of information registered by the scanner, the animation manager displays a dynamic image corresponding to the piece of information on the icon of the service process. Specifically, the dynamic image may be displayed when the page of the service process is not the one displayed currently. And upon receiving a scanning result from the scanner, the animation manager stops displaying of the dynamic image on the icon of the service process and displays the scanning result on the icon of the service process.

Figure 3A:
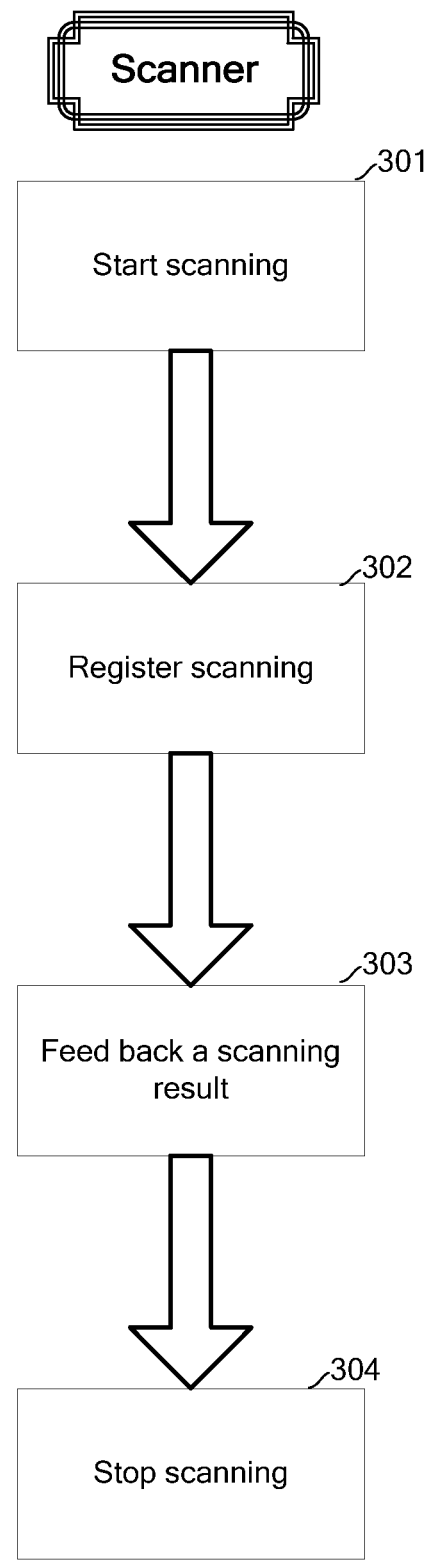
FIG. 3a is a diagram showing a working procedure of a scanner in an embodiment.
Figure 3B:
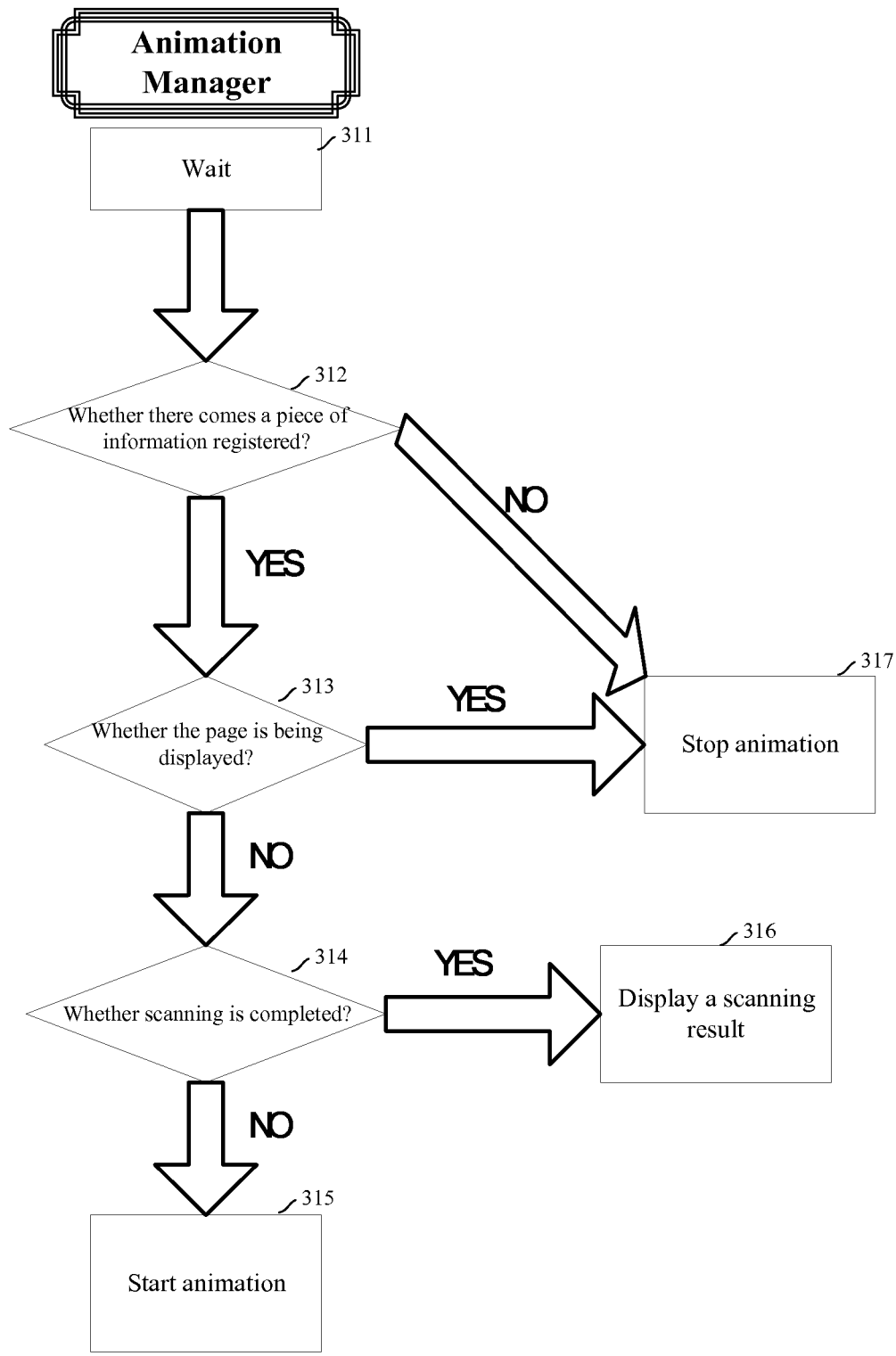
FIG. 3b is a diagram showing a working procedure of an animation manager in an embodiment.

FIGS. 3*a* and 3*b* show the working procedures of a scanner and an animation manager in an embodiment. As shown in FIG. 3*a*, the scanner starts scanning at Step 301, registers in the animation manager information obtained during scanning at Step 302, feeds back a scanning result to the animation manager at Step 303, and stops scanning at Step 304. As shown in FIG. 3*b*, the animation manager performs the following steps.

In Step 311, the animation manager keeps in a waiting state until there comes a piece of registered information from the scanner or the currently-displayed page is switched from one page to another. If there comes a piece of registered information from the scanner or the currently-displayed page is switched from one page to another, Step 312 is to be executed.

In Step 312, the animation manager determines whether there is the registered information from the scanner, if yes, Step 313 is to be executed, and otherwise if no, the animation manger stops the animation at Step 317.

In Step 313, the animation manager determines whether the page currently displayed is the page of the service process corresponding to the scanner, if no, Step 314 is to be executed, and otherwise if yes, the animation manger stops the animation at Step 317.

In Step 314, the animation manager determines whether scanning of the scanner is completed, if yes, the animation manager displays the scanning result received from the scanner at Step 316, and otherwise if no, Step 315 is to be executed.

In Step 315, the animation manger starts the animation corresponding to the registered information received from the scanner on the icon of the service process corresponding to the scanner.

Figure 4A:
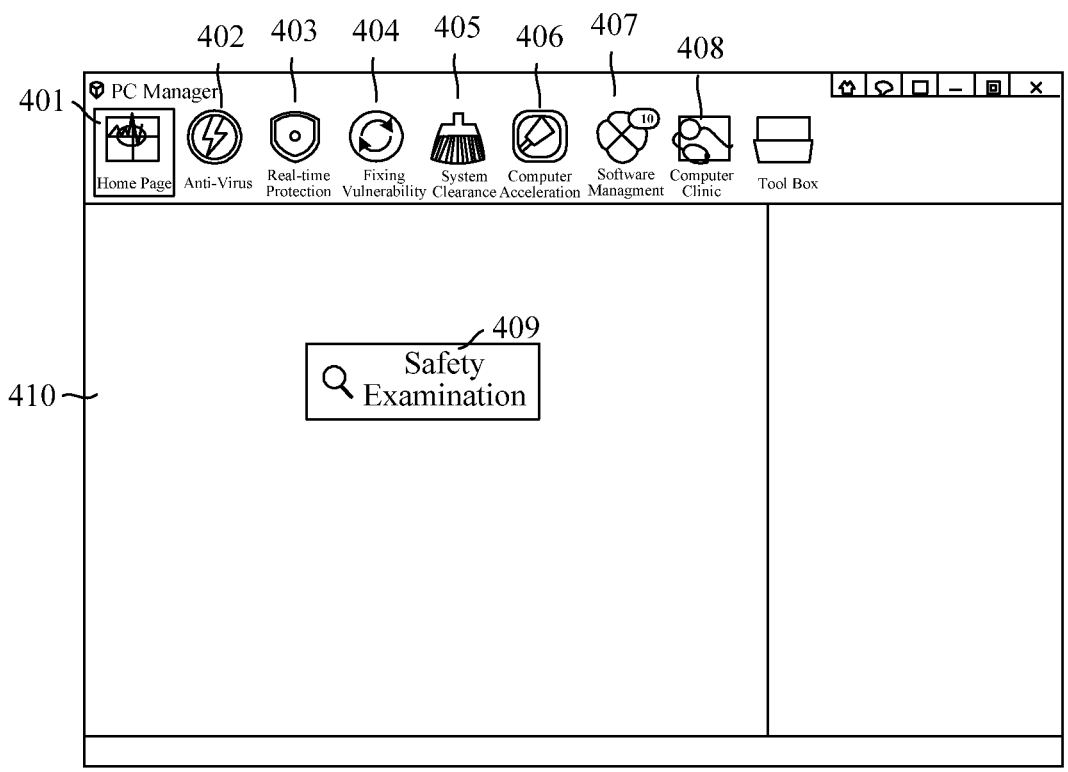
FIG. 4a is a diagram showing an operation interface of a service process in an embodiment.
Figure 4B:
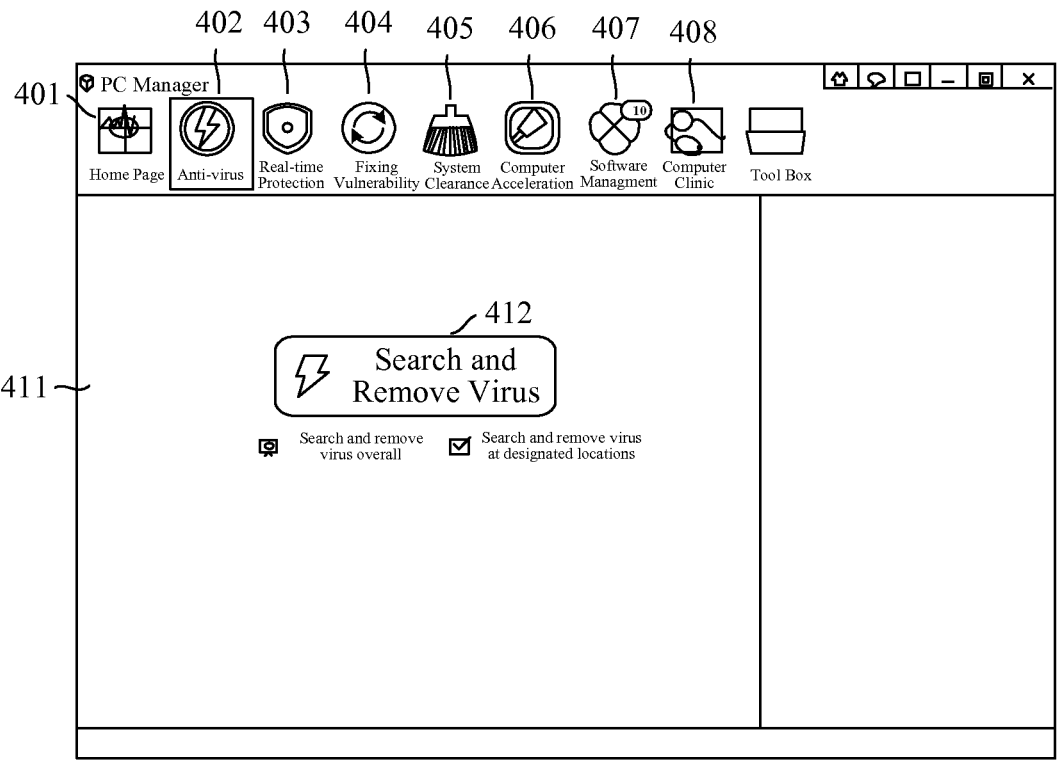
FIG. 4b is a diagram showing an interface on which execution progress of a service process is presented on an icon in an embodiment.
Figure 4C:
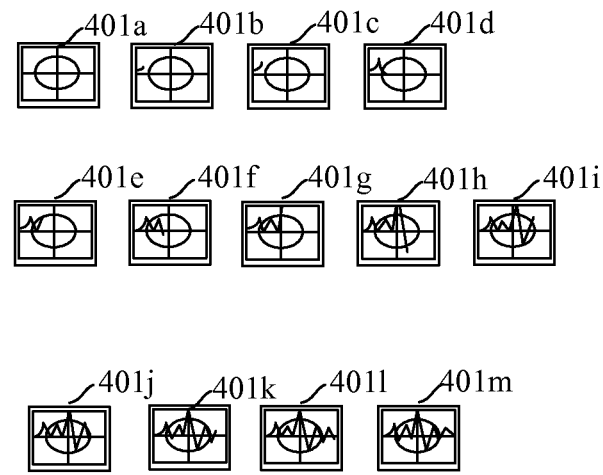
FIG. 4c is a set of diagrams showing a dynamic image displayed on the icon of a service process for presenting execution progress in an embodiment.

FIGS. 4*a*~4*c* shows an embodiment of presenting the execution progress of a service process on an icon. In this embodiment, the application client is a PC manager client. After the PC manager client is started, the main interface is presented. As shown in FIGS. 4*a* and 4*b*, the main interface of the PC manager client provides pages of several service processes of home-page safety examination, anti-virus, real-time protection, fixing vulnerability, system acceleration, software management and computer clinic with their respective icons 401~408. In FIG. 4*a*, the page 410 of the service process of home-page safety examination is displayed, and in the page 410, a button 409 is provided. By clicking the button 409, the user can start the service process of safety examination, thereby the scanner corresponding to the safety examination starts scanning. In FIG. 4*b*, the page 411 of the service process of anti-virus is displayed on which a button 412 is provided while the service process of safety examination is still running, and the execution progress of the safety-examination service process is presented on the icon 401 via a dynamic image. Thus, although the page 410 of the safety-examination service process is not displayed on the screen, the user is able to learn the execution progress of the safety-examination service process from the dynamic image displayed on the icon 401. FIG. 4c shows the dynamic image 401a~401m displayed on the icon 401 along with changing of the execution progress of the safety-examination service process.

In the above embodiments, the icon can be utilized with a high efficiency, the functions of identification, status indication and action switch can be combined on one icon, so that the execution progress of the service process can be dynamically presented through the icon even when the page of the service process is not displayed on the screen, the user can learn the dynamic state of the service process without additional operations, thereby the operations of the user can be simplified, the processing resources of the computing device can be saved and the performance thereof can be improved.

Figure 1A:
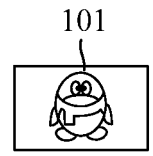
FIG. 1a is a diagram showing an icon in the prior art.
Figure 1B:
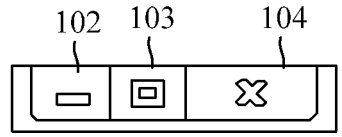
FIG. 1b is a diagram showing an icon in the prior art.
Figure 5:
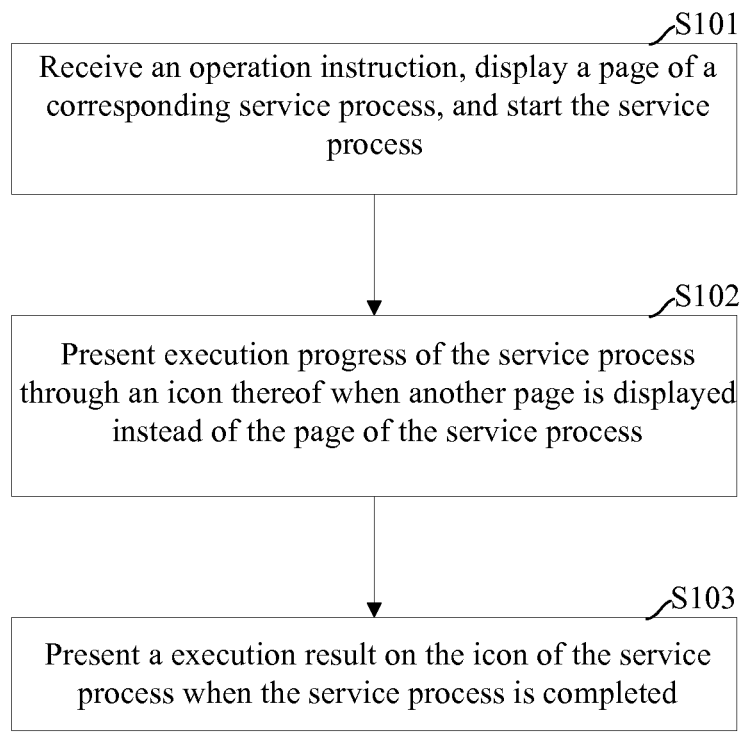
FIG. 5 shows a flow chart of a method according to an embodiment.

FIG. 5 shows a flow chart of a method for presenting service processes according to an embodiment. As shown in FIG. 5, besides Steps S101 and S102 shown in FIG. 1, the method further includes Step S103 where after the service process is completed, an execution result is presented on the icon of the service process. In an embodiment, the execution result is displayed at a designated position on the icon of the service process, e.g., a result state representing the execution result is displayed through a small icon located at a certain position on the icon of the service process.

Figure 6A:
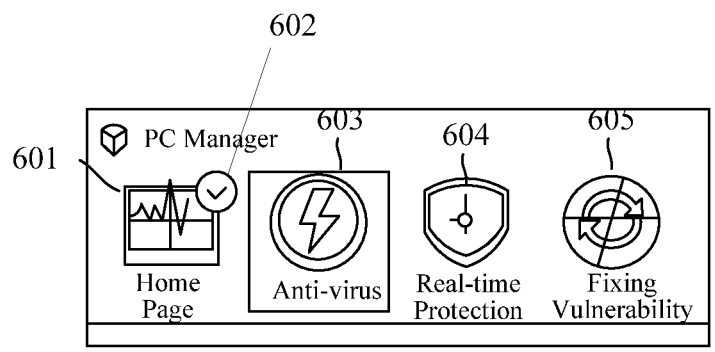
FIG. 6a is a diagram showing an interface on which an execution result of a service process is presented on an icon in an embodiment.
Figure 6B:
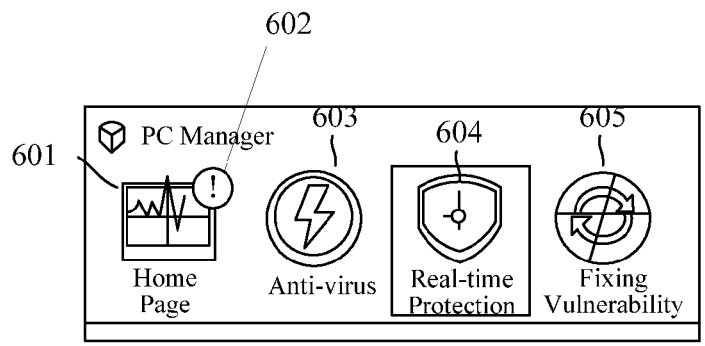
FIG. 6b is a diagram showing an interface on which an execution result of a service process is presented on an icon in an embodiment.

Various result states may be presented according to different service processed. In the application client of the PC manager, the result state for the safety-examination service process may be a safe state or an alarm state. As shown in FIG. 6a, when the execution result of the service process indicates that the computing device is in a safe state, a check mark "√" is presented on a small icon 602 located at the upper right corner of the icon 601. FIG. 6a also shows icons 603~605 for service processes of anti-virus, real-time protection and fixing vulnerability, and the page of the anti-virus service process is currently displayed while the user can learn the execution result of the service process of home-page safety examination through the icons 601 and 602. As shown in FIG. 6b, when the execution result of the service process indicates that the computing device is in an alarm state, an exclamation mark "!" is presented on the small icon 602 located at the upper right corner of the icon 601 which indicates that it is needed to further check the computing device according to the result of the safety examination. FIG. 6b also shows icons 603~605 for service processes of anti-virus, real-time protection and fixing vulnerability, and the page of the real-time protection service process is currently displayed while the user can learn the execution result of the service process of home-page safety examination through the icons 601 and 602.

In an embodiment, the presentation of the execution result is implemented by the scanner and the animation manager. Upon completion of scanning, the scanner feeds back the scanning result to the animation manager, and then the animation manager displays the result state corresponding to the scanning result on the icon of the corresponding service process.

In the above embodiment, various execution results can be presented on the icon of the service process even when the page of the service process is not displayed, so that the user can make a judgment and further processing according to the execution result without issuing additional operation instructions, thereby the operations of the user can be simplified, the processing resources of the computing device can be saved and the performance thereof can be improved.

Figure 7:
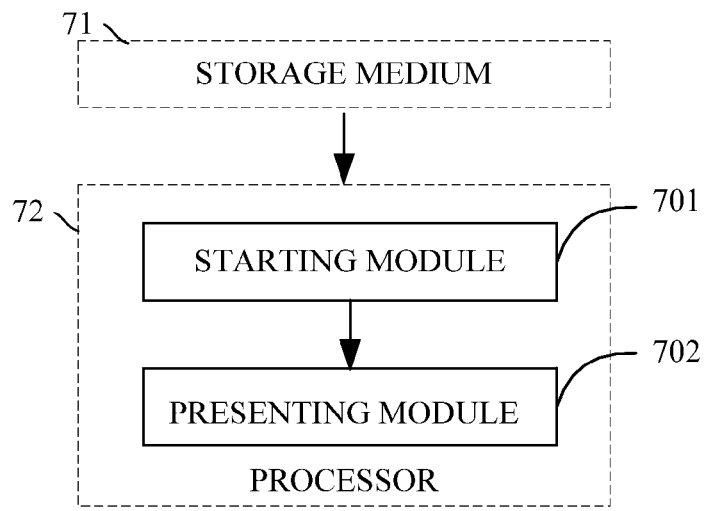
FIG. 7 is a diagram showing a structure of an apparatus according to an embodiment.

Based on the above embodiments, an apparatus for presenting service processes is also provided. As shown in FIG. 7, the apparatus at least includes a starting module 701 and a presenting module 702. The starting module 701 is adapted to receive an operation instruction through a main interface of an application client, display a page of a service process in response to the received operation instruction, and start the service process in response to an operation instruction received through the page of the service process. The presenting module 702 is adapted to present execution progress of the service process through an icon of the service process when the page of another service process is displayed instead of the page of the former service process. The presenting module 702 may be further adapted to present an execution result of the service process on the icon thereof after the service process is completed.

In practice, the user may click the icon of the service process to enter the page (namely the interface) of the service process, and accordingly, the starting module 701 receives an operation instruction through the main interface of the application client and displays the page of the service process.

Figure 8:
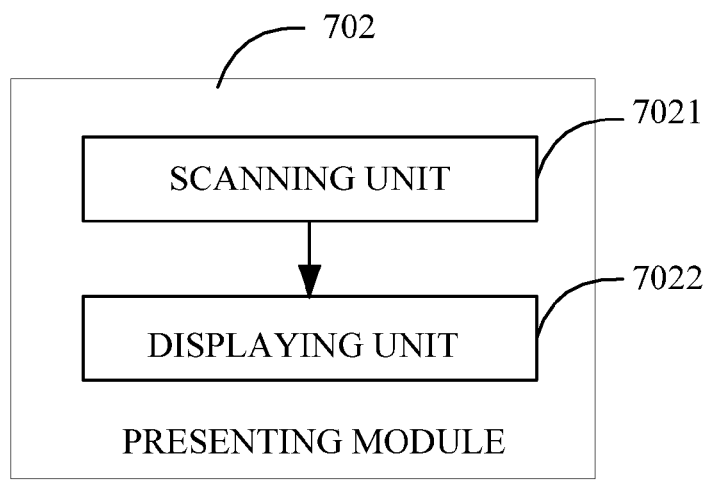
FIG. 8 is a diagram showing a structure of a presenting module in an embodiment.

In an embodiment, the presenting module 702 may present the execution progress of the service process through displaying a dynamic image on the icon of the service process. And the execution-progress presentation based on the dynamic image may be implemented by a scanner and an animation manager. As shown in FIG. 8, the presenting module 702 may include a scanning unit 7021 and a displaying unit 7022.

In an embodiment, the service process is executed through scanning of a scanner corresponding to the service process. The scanning unit 7021 includes a scanner and the displaying unit 7022 includes an animation manager. During scanning of the scanner, the scanning unit 7021 registers through the scanner information that the scanner obtains from scanning to the animation manager of the displaying unit 7022. The displaying unit 7022 controls displaying of the dynamic image on the icon of the service process through the animation manager according to the information registered through the scanner.

In an embodiment, upon receiving a piece of information registered by the scanner, the animation manager displays a dynamic image corresponding to the piece of information on the icon of the service process. Specifically, the dynamic image may be displayed when the page of the service process is not the one displayed currently. And upon receiving a scanning result from the scanner, the animation manager stops displaying of the dynamic image on the icon of the service process and displays the scanning result on the icon of the service process.

The detailed implementation of the functions of the modules in the above apparatus may refer to the aforementioned descriptions for the method embodiments and will not be discussed again herein.

In the above embodiments of the method and the apparatus, the execution progress of the service process can be dynamically presented through the icon even when the page of the service process is not displayed on the screen, the user can learn the dynamic state of the service process without additional operations, thereby the operations of the user can be simplified, the processing resources of the computing device can be saved and the performance thereof can be improved. Furthermore, various execution results can be presented on the icon of the service process even when the page of the service process is not displayed, so that the user can make a judgment and further processing according to the execution result without issuing additional operation instructions, thereby the operations of the user can be further simplified and the performance thereof can be further improved.

The methods and modules described herein may be implemented by hardware, machine-readable instructions or a combination of hardware and machine-readable instructions. Machine-readable instructions used in the embodiments disclosed herein may be stored in storage medium readable by multiple processors, such as hard drive, CD-ROM, DVD, compact disk, floppy disk, magnetic tape drive, RAM, ROM or other proper storage device. Or, at least part of the machine-readable instructions may be substituted by specific-purpose hardware, such as custom integrated circuits, gate array, FPGA, PLD and specific-purpose computers and so on.

A machine-readable storage medium is also provided, which is to store instructions to cause a machine such as the computing device to execute one or more methods as described herein. Specifically, a system or apparatus having a storage medium that stores machine-readable program codes for implementing functions of any of the above embodiments and that may make the system or the apparatus (or CPU or MPU) read and execute the program codes stored in the storage medium.

Therefore, the apparatus shown in FIG. 8 may include a storage medium 71 and a processor 72, the storage medium 71 stores instructions executable for the processor 72. The processor 72 may include the starting module 701 and the displaying module 702, and through executing the instructions read from the storage medium 71, the processor 72 can accomplish the functions of the starting module 701 and the displaying module 702 as mentioned above.

In this situation, the program codes read from the storage medium may implement any one of the above embodiments, thus the program codes and the storage medium storing the program codes are part of the technical scheme.

The storage medium for providing the program codes may include floppy disk, hard drive, magneto-optical disk, compact disk (such as CD-ROM, CD-R, CD-RW, DVD-ROM, DVD-RAM, DVD-RW, DVD+RW), magnetic tape drive, Flash card, ROM and so on. Optionally, the program code may be downloaded from a server computer via a communication network.

It should be noted that, alternatively to the program codes being executed by a computer (namely a computing device), at least part of the operations performed by the program codes may be implemented by an operation system running in a computer following instructions based on the program codes to realize a technical scheme of any of the above embodiments.

In addition, the program codes implemented from a storage medium are written in storage in an extension board inserted in the computer or in storage in an extension unit connected to the computer. In this embodiment, a CPU in the extension board or the extension unit executes at least part of the operations according to the instructions based on the program codes to realize a technical scheme of any of the above embodiments.

The above description just shows several embodiments of the present application in order to present the principle and implementation of the present application, and is in no way intended to limit the scope of the present application. Any modifications, equivalents, improvements and the like made within the spirit and principle of the present application should be encompassed in the scope of the present application.

What is claimed is:

1. A method for presenting service processes performed by a processor by executing instructions stored in a memory, wherein the processor and memory are comprised by an apparatus, the method comprising:
   receiving a first operation instruction;
   displaying a page of a first service process in response to the received first operation instruction;
   receiving a second operation instruction through the page of the first service process;
   starting the first service process in response to the received second operation instruction;
   presenting execution progress of the first service process through an icon of the first service process upon displaying a page of a second service process instead of the page of the first service process in response to receiving a third operation instruction; and
   upon completion of the first service process, presenting a result state through an icon located at a predetermined position on the icon of the first service process, wherein the result state comprises at least one of a safe state and an alarm state,
   wherein the first service process is executed through scanning of a scanner corresponding to the first service process, and
   wherein presenting the execution progress of the first service process through the icon of the first service process comprises:
   presenting the execution progress of the first service process through a dynamic image displayed on the icon of the first service process, by
   during scanning of the scanner, registering, by the scanner, information obtained from scanning in an animation manager, and
   controlling, by the animation manager, displaying of the dynamic image on the icon of the first service process according to the information registered by the scanner, and
   wherein controlling, by the animation manager, displaying of the dynamic image on the icon of the first service process according to the information registered by the scanner comprises:
   upon receiving a piece of information registered by the scanner, displaying, by the animation manager, a dynamic image corresponding to the piece of information on the icon of the first service process when the page of the first service process is not the one displayed currently, and
   upon receiving a scanning result from the scanner, stopping, by the animation manager, displaying of the dynamic image on the icon of the first service process and displaying the scanning result on the icon of the first service process.

2. The method of claim 1, wherein upon switching between pages, stopping, by the animation manager, displaying of the dynamic image on the icon of the first service process when the page of the first service process is the one displayed currently.

3. The method of claim 1, further comprising:
   presenting the execution progress of the first service process by using at least one of: a default mode, or the icon of the first service process, when the page of the first service process is displayed.

4. The method according to claim 1, further comprising:
displaying a page of a second service process in response to the received third operation instruction;
wherein the scanner obtains information corresponding to the first service process during the display of the page of the second service process.

5. The method according to claim 4, further comprising:
presenting the execution progress of the first service process while displaying the page of the second service process by displaying the dynamic image on the icon corresponding to the first service process, the dynamic image indicating a progress of the first service process from the obtained information.

6. An apparatus for presenting service processes, the apparatus comprising: a storage medium and a processor, wherein the storage medium stores instructions executable for the processor, when executing the instructions, the processor is configured to:
receive a first operation instruction, display a page of a first service process in response to the received first operation instruction, receive a second operation instruction through the page of the first service process, start the first service process in response to the received second operation instruction;
present execution progress of the first service process through an icon of the first service process upon displaying a page of a second service process instead of the page of the first service process in response to receiving a third operation instruction; and,
upon completion of the first service process, present a result state through an icon located at a predetermined position on the icon of the first service process, wherein the result state comprises at least one of a safe state and an alarm state,
wherein when executing the instructions, the processor is further configured to execute the first service process through scanning of a scanner corresponding to the first service process, and to present the execution progress of the first service process through a dynamic image displayed on the icon of the first service process,
wherein when executing the instructions to present the execution progress of the first service process through the dynamic image displayed on the icon of the first service process, the process is further configured to:
during scanning of the scanner, register, by the scanner, information obtained from scanning in an animation manager; and
control, by the animation manager, display of the dynamic image on the icon of the first service process according to the information registered by the scanner, and
wherein when executing the instructions to control, by the animation manager, display of the dynamic image on the icon of the first service process according to the information registered by the scanner, the processor is further configured to:
upon receiving a piece of information registered by the scanner, display, by the animation manager, a dynamic image corresponding to the piece of information on the icon of the first service process when the page of the first service process is not the one displayed currently; and
upon receiving a scanning result from the scanner, stop, by the animation manager, display of the dynamic image on the icon of the first service process and display the scanning result on the icon of the first service process.

7. The apparatus of claim 6, wherein when executing the instructions, the processor is further configured to present the execution progress of the first service process through a dynamic image displayed on the icon of the first service process.

8. The apparatus of claim 7, wherein the first service process is executed through scanning of a scanner corresponding to the first service process; when executing the instructions, the processor is further configured to:
register, through the scanner, information obtained during scanning of the scanner; and
control displaying of the dynamic image on the icon of the first service process according to the information registered.

9. The apparatus of claim 6, wherein when executing the instructions, the processor is further configured to present the execution progress of the first service process by using at least one of: a default mode, or the icon of the first service process, when the page of the first service process is displayed.

10. The apparatus according to claim 6, wherein when executing the instructions, the processor is further configured to:
display a page of a second service process in response to the received third operation instruction;
wherein the scanner obtains information corresponding to the first service process during the display of the page of the second service process.

11. The apparatus according to claim 10, wherein when executing the instructions, the processor is further configured to:
present the execution progress of the first service process while displaying the page of the second service process by displaying the dynamic image on the icon corresponding to the first service process, wherein the dynamic image indicates a progress of the first service process from the obtained information.

12. A non-transitory machine-readable storage medium, storing instructions to cause a machine to:
receive a first operation instruction;
display a page of a first service process in response to the received first operation instruction;
receive a second operation instruction through the page of the first service process;
start the first service process in response to the received second operation instruction;
present execution progress of the first service process through an icon of the first service process upon displaying a page of a second service process instead of the page of the first service process in response to receiving a third operation instruction;
upon completion of the first service process, present a result state through a small an icon located at a predetermined position on the icon of the first service process, wherein the result state comprises at least one of a safe state and an alarm state;
execute the first service process through scanning of a scanner corresponding to the first service process;
present the execution progress of the first service process through a dynamic image displayed on the icon of the first service process;
during scanning of the scanner, register, by the scanner, information obtained from scanning in an animation manager;
control, by the animation manager, display of the dynamic image on the icon of the first service process according to the information registered by the scanner;

upon receiving a piece of information registered by the scanner, display, by the animation manager, a dynamic image corresponding to the piece of information on the icon of the first service process when the page of the first service process is not the one displayed currently; and upon receiving a scanning result from the scanner, stop, by the animation manager, display of the dynamic image on the icon of the first service process and display the scanning result on the icon of the first service process.

13. The non-transitory machine-readable storage medium according to claim 12, wherein the instructions are further configured to cause a machine to:

display a page of a second service process in response to the received third operation instruction;

wherein the scanner obtains information corresponding to the first service process during the display of the page of the second service process.

14. The non-transitory machine-readable storage medium according to claim 13, wherein the instructions are further configured to cause a machine to:

present the execution progress of the first service process while displaying the page of the second service process by displaying the dynamic image on the icon corresponding to the first service process, wherein the dynamic image indicates a progress of the first service process from the obtained information.

* * * * *